United States Patent [19]

Mijnders

[11] Patent Number: 4,864,806
[45] Date of Patent: Sep. 12, 1989

[54] MOWING DEVICE WITH FORCED AIR SUPPLY

[76] Inventor: Gijsbert J. Mijnders, 42 Spaanse Ruiterpad, 2153 ER Nieuw-Vennep, Netherlands

[21] Appl. No.: 44,825

[22] Filed: May 1, 1987

[30] Foreign Application Priority Data

May 9, 1986 [NL] Netherlands .......................... 8601175

[51] Int. Cl.⁴ ............................................ A01D 34/66
[52] U.S. Cl. .......................................... 56/12.8; 56/6; 56/13.6
[58] Field of Search ................. 56/6, 10.1, 12.8, 13.4, 56/13.6

[56] References Cited

U.S. PATENT DOCUMENTS

| | | | |
|---|---|---|---|
| 3,091,906 | 6/1963 | Hall | 56/13.4 |
| 3,400,523 | 9/1968 | Klingofstrom | 56/13.4 |
| 4,087,955 | 5/1978 | Szymanis | 56/13.4 |
| 4,110,959 | 9/1978 | Oosterling et al. | 56/6 |
| 4,121,405 | 10/1978 | Wolf | 56/13.4 |
| 4,407,112 | 11/1983 | Shepherd et al. | 56/13.4 |

FOREIGN PATENT DOCUMENTS 2505679 8/1975 Fed. Rep. of Germany ....... 56/13.6

Primary Examiner—Paul J. Hirsch

[57] ABSTRACT

A mower bar is disclosed having rotating cutters driven by vertical drive shafts and associated gearing. The mower bar includes an air duct along its forward edge and at each rotating cutter. Air ducts are also included in each cutters' centered dish portion.

10 Claims, 1 Drawing Sheet

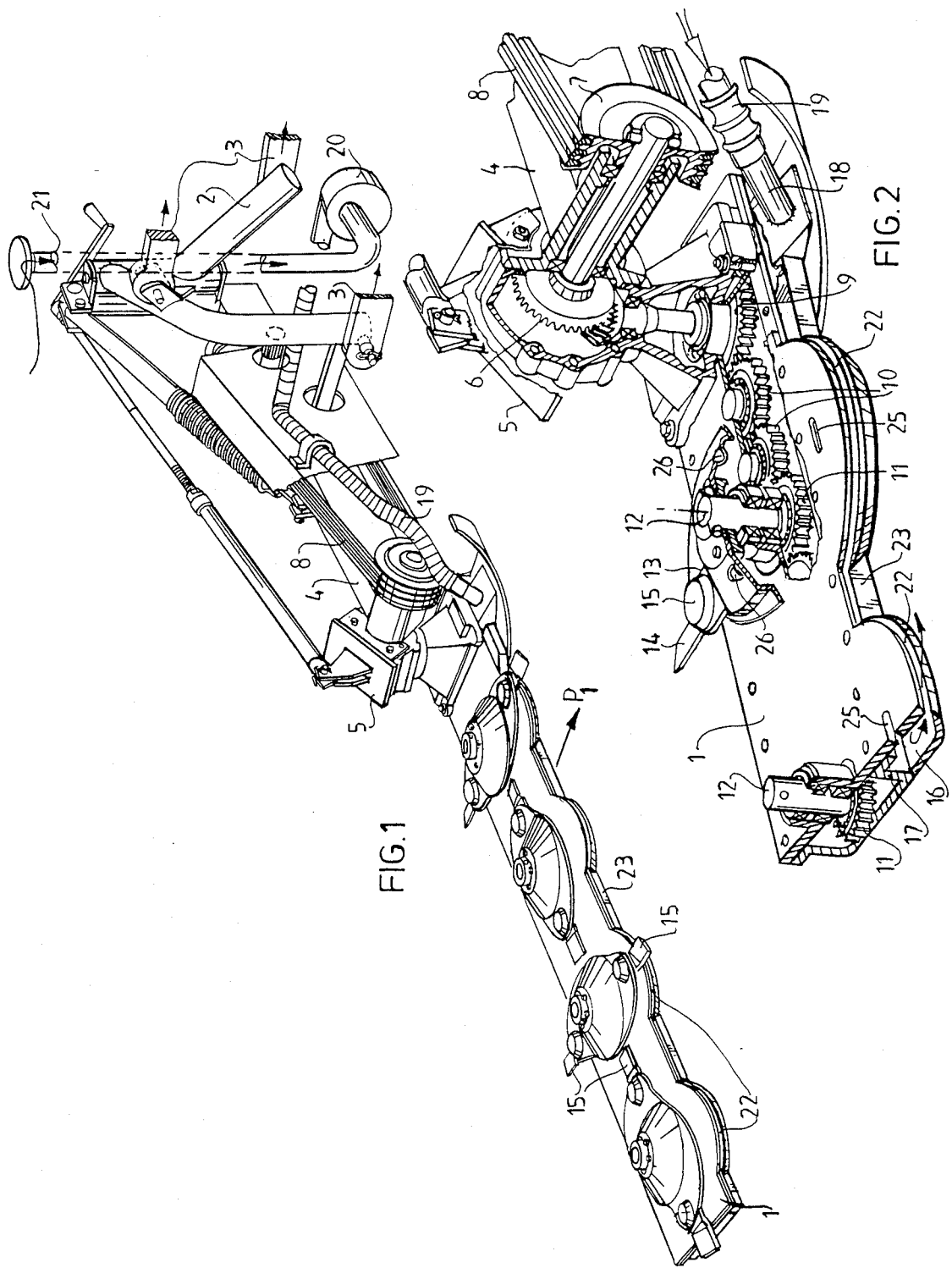

MOWING DEVICE WITH FORCED AIR SUPPLY

The invention relates to a device for mowing agricultural crops, particularly grass, provided with an elongate mower bar towed in transverse direction over the field and having a number of dish-like carriers each having at least one blade, whereby the bar comprises transmission members for driving each carrier on a vertical shaft.

The problem in mowing the crop using a mowing device of the type described in the preamble is that the disposal of the crop over the mover bar presents difficulties. Once cut the crop may not be struck by the blade again, which, apart from causing loss of energy, diminishes the quality of the mown crop, this being especially important with long-stalk crops. Proposals have already been made to improve the disposal of the crop, by for example forming the blade as well as the carrier with means for generating an upwardly directed air flow. This solution has been found not to work satisfactorily in practice because of the lack of an adequate air supply.

The invention has for its object to improve a device of the type described in the preamble such that the required disposal of the crop over the bar is aided considerably. The device is distinguished in that the bar has an air supply duct which connects onto one or more preferably slit-like openings in the bar. The (slit-like) openings may be arranged on the front, top and/or back part of the bar.

This air supply duct can if required by connected to a separate blowing device which feeds the air under pressure to the slit-like opening and the mower dishes. If however as stated the mower disc itself functions as blowing device the separate blowing device can be dispensed with.

The slit-like opening preferably has at least at the front a form running concentrically relative to the vertical shaft, so as to ensure an optimum supply to the blade moving in a circular path, and therefore application of a good, upwardly directed impetus to the crop and the required discharge over the bar.

In accordance with a further embodiment the slit-like openings running concentrically with the shafts are connected to one another, in order to form a single continuous slit over the length of the bar. In this way the overlapping mowing range of the blades is also provided with a sufficient air flow. If an opening is arranged in the upper part of the bar, the dish can have through-feed apertures for the air, which through-feed openings can be formed with or without a depression.

A simple embodiment is obtained by locating the duct in the bar and giving it the form of a continuous chamber separated from the transmission members.

The invention is further elucidated in the figure description of an embodiment following below.

In the drawing:

FIG. 1 shows a perspective top view of the device according to the invention,

FIG. 2 shows a perspective top view of a portion of the device from FIG. 1 on a larger scale and with parts partially broken away.

The device shown in the figures consists substantially of an elongate mower bar 1, which is pulled forward over the field in the direction of the arrow P1. For this purpose the mower bar is suspended on a tubular carrier frame 2 which is attached via coupling means to the three-point suspension 3 of a tractor (not shown). The tubular frame 2 is formed with a cross beam 4, on the end of which facing towards mower bar 1 is arranged a gearbox 5, the underside of which connects onto the top of bar 1. Gearbox 5 comprises a right angle transmission 6 which is driven by a pulley 7, around which are placed ropes 8. These ropes 8 lead to a pulley mounted for rotation on beam 4 and driven by the power take-off (not shown) of the tractor.

The right-angle transmission 6 further leads to a drive gear wheel 9 in mower bar 1, see FIG. 2, which wheel drives each of the gear wheels 11 with an upright shaft 12 via intermediate gear wheels 10. Firmly attached to upright shaft 12 is a carrier 13 which supports knife blades 14 arranged diametrically opposed to each other. The knife blades 14 can swivel of themselves on an axle journal 15 and direct themselves outward automatically as a result of the centrifugal force.

In the illustrated embodiment are shown four vertical shafts 12 with carriers 13, but it will be apparent that more than four of them can be used, whereby mower bar 1 will have a greater length.

The arrangement of carriers 13 is such that the knife blades 14 describe a path which overlaps the adjacent path of the neighbouring knife blade, and as a result there occur overlapping mowing ranges between carriers 13.

In accordance with a feature of the invention the bar 1 is formed with an air duct 16 which is separated from the space with the transmission gear wheels 9, 10 and 11 via an upright wall 17. This air duct 16 is formed at the gearbox 5 with a connecting stump 18 to which is coupled an air hose 19. Air hose 19 leads to a blowing device 20 which is supported by frame 2. Supply of blowing device 20 is carried out via a stand pipe 21 which extends above the machine.

The air duct 16 is formed on the front side relative to the towing direction with a slit-like opening 22, which slit-like opening has a form running concentrically relative to vertical shaft 12 and which extends into the adjoining slit-like opening 22 via a short, straight portion 23. In this way a continuous slit-like opening is created over the full length of mower bar 1.

The curved, concentric form of part 22 of the slit is effected as a result of a forward directed widening of the lower and upper walls of bar 1, the widening being circular as seen in top view.

The bar 1 is formed in the upper face with extra holes 25, each opening in the area under the dish 13. Dish 13 has in the central part one or more holes 26 with introverted depressions 27 in order to carry the air above the central part of the dish. This improves the disposal of the crop.

The device described above works as follows:

Assumed here is a familiarity with the operation of the mower bar during mowing, which is pulled forward over the field in the direction of arrow P1 and which thus cuts a determined strip of crop, the stalks of which must fall behind mower bar 1. The stalks must therefore be carried over the mower dishes and disposed of such that the blade momentarily at the rear does not cut through the stalks again.

Serving for this purpose is the air supply via duct 16, which becomes forced as a result of starting blowing device 20. This supply air via stand pipe 21 and then feeds it via hose 19 to the duct 16. The air flows outside via the slit-like opening 22, 23 and applies an upwardly directed thrust to the crop, doing so both before and during the cutting thereof. Although not strictly necessary, it is recommended that the knife blades 14 be given a position tilted relative to the direction of rotation so that the action of the depressions also causes an upwardly directed air flow. The dish-shaped carriers 13 can also be formed with extra depression means to generate this air flow. The speed of the air flow out of the slit-like openings can be approximately equal to or greater than the vertical air speed generated by the tilted knife blade and the additional depression means. As a result of the curved part 22 and the straight part 23 of the slit-like opening an optimal air supply is sent to the underside of knife blades 14 in both its own and its overlapping mowing range. The air from opening 25 can flow out upwards via opening 26.

The air flow generated in this way can be so strong that the crop can be discharged, with or without use of guide members (not shown) onto a cross conveyor or the like.

The invention is not limited to the above described embodiments. The air slit 22, 23 does not necessarily have to be continuous, but it can be interrupted. A corresponding slit 22, 23 can also be situated on the rear side by means of an identically formed air duct 16.

I claim:

1. A mowing device comprising the combination of an elongate mowing bar having an upper face and a hollow interior and drive means located in such interior, a plurality of upright drive shafts projecting above the upper face of the mowing bar and connected to the drive means for rotation thereby, the mowing bar having an air duct along its forward edge and the air duct having semicircular projections from the forward edge which are aligned forwardly of the drive shafts, cutter means connected to the drive shafts and overlying the mowing bar for cutting crop intercepted by the mowing bar, each cutter means including a downwardly dished central portion having air flow openings and at least one projecting cutter blade whereby the central portion sweeps a circular path overlying the upper face of the mowing bar while the cutter blade sweeps a path having arcuate portions passing beyond a respective semicircular projection of the air duct, pressurized air supply means for delivering pressurized air into the air duct, slit-like opening means for discharging pressurized air forwardly and upwardly from the air duct along the forward edge of the mower bar, each semicircular projection having a peripheral slit forming part of the slit-like opening means which discharges air forwardly and upwardly along the arc of the semicircular projection, further opening means in the upper face of each semicircular projection for delivering pressurized air upwardly into a corresponding central portion of the cutter means for upward expulsion through the air flow openings in the central portion of a corresponding cutter means to create an uplifting effect on crop which has once been cut to avoid multiple cutting of already cut crop and to assist in conveying the already cut crop over the rear of the mowing bar.

2. A mowing device as defined in claim 1 wherein each carrier and its blade is configured as a depression which, while rotating, effects an upward flow of air and augments conveying the cut crop over the rear of the mower bar.

3. A device for mowing agricultural crops, particularly grass, which comprises an elongate mower bar towed in transverse direction over a field on which the crop is growing and having a number of dish-like carriers each of which has at least one blade, the mower bar including transmission members for rotating each carrier on a vertical shaft, the mower bar having an air supply duct provided with slit-like opening means for creating an uplifting air flow effect on the crop to avoid multiple cutting of crop once cut and to assist in conveying the cut crop over the rear of the mowing bar.

4. A device as defined in claim 3 wherein the slit-like opening means includes arcuate portions concentric with the vertical shafts.

5. A device as defined in claim 4 wherein the arcuate portions are joined to define a continuous slit along the length of the mower bar.

6. A device as defined in claim 3 wherein the air supply duct is a duct separate from the transmission members.

7. A device as defined in claim 3 including a blowing device remote from the air supply duct and conduit means connecting the blowing device to the air supply duct.

8. A device as defined in claim 3 wherein each carrier and its blade is configured as a depression which, while rotating, effects an upward flow of air.

9. A device as defined in claim 8 including openings in the air supply duct feeding air upwardly into each carrier, each carrier having a further opening for discharging such air feed to it upwardly to augment the upward flow of air effected by each depression.

10. A mowing device comprising the combination of an elongate mowing bar having an upper face and a hollow interior and drive means located in such interior, a plurality of upright drive shafts projecting above the upper face of the mowing bar and connected to the drive means for rotation thereby, the mowing bar having an air duct along its forward edge having portions aligned forwardly of the drive shafts, cutter means connected to the drive shafts and overlying the mowing bar for cutting crop intercepted by the mowing bar, each cutter means including a downwardly dished central portion having and at least one projecting cutter blade whereby the central portions sweeps a circular path overlying the upper face of the mowing bar while the cutter blade sweeps a path forwardly of said portions of the air duct, pressurized air supply means for delivering pressurized air into the air duct, slit-like opening means for discharging pressurized air forwardly and upwardly from said portions of the air duct along the forward edge of the mower bar, each portion having a slit forming part of the slit-like opening means which discharges air forwardly and upwardly to create an uplifting effect on crop which has been cut to avoid multiple cutting of crop once cut and to assist in conveying the cut crop over the rear of the mowing bar.

* * * * *